Patented Dec. 15, 1953

2,662,922

UNITED STATES PATENT OFFICE 2,662,922

METHOD FOR PRODUCTION OF COMPOSITION OF MATTER

Morton Kleiman and Arthur Goldman, Chicago, Ill., assignors to Arvey Corporation, a corporation of Illinois No Drawing. Application July 13, 1950,
Serial No. 173,688

6 Claims. (Cl. 260—617)

This invention relates to the production of a valuable composition of matter. More specifically, this invention relates to a novel method for preparing 1-hydroxy-4,5,6,7,8,8-hexachloro-3a,4,7,7a-tetrahydro-4,7-methanoindene by direct oxidation in one step, of the adduct of hexachlorocyclopentadiene and cyclopentadiene (4,5,6,7,8,8-hexachloro-3a,4,7,7a-tetrahydro-4,7-methanoindene) with selenium dioxide.

The adduct of hexachlorocyclopentadiene and cyclopentadiene can be prepared simply by intermixing said hexachlorocylopentadiene and said cyclopentadiene preferably in the absence of additional solvent. The reaction proceeds in a satisfactory manner at room temperature and also may be accomplished at cooler or more elevated temperatures. The reaction is somewhat exothermic and the temperatures thereof should be controlled such that temperatures not exceeding about 200° C. and preferably not exceeding about 100–120° C. are maintained throughout the course of the reaction. The reactants may be utilzed in a molar ratio of 1:1; however, an excess of either reactant can be present. The reaction product, namely the adduct of hexachlorocyclopentadiene and cyclopentadiene, is crystalline in nature and may be purified by recrystallization from a solvent such as methanol.

Thus, as a specific method for preparing the aforementioned adduct, hexachlorocyclopentadiene may be placed in a vessel equipped with a mechanical stirrer, thermometer and reflux condenser. The hexachlorocylopentadiene may then be heated to about 70° C. and have added thereto in a portionwise manner an equal molar quantity of cyclopentadiene. The reaction temperature may be maintained at about 70–85° C. After the cyclopentadiene has been completely added, the stirring may be continued for several hours. The crystalline material thus formed may be purified by recrystallization one or more times from methanol.

The reaction of hexachlorocyclopentadiene and cyclopentadiene may be symbolized as follows:

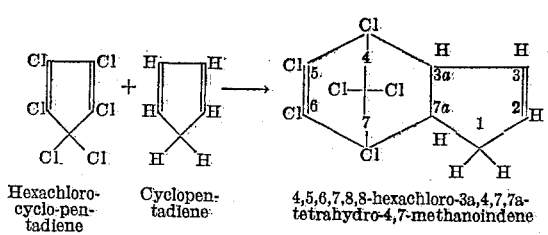

Hexachloro-cyclo-pentadiene  Cyclopentadiene  4,5,6,7,8,8-hexachloro-3a,4,7,7a-tetrahydro-4,7-methanoindene According to "The Ring Index" by Patterson and Capell, A. C. S. Monograph Series No. 84, 1940, dicyclopentadiene, $C_{10}H_{12}$, is described as 4,7-methano-3a,4,7,7a-tetrahydroindene. Following this accepted system of nomenclature, the adduct of hexachlorocyclopentadiene and cyclopentadiene would be described as 4,5,6,7,8,8-hexachloro-3a,4,7,7a-tetrahydro-4,7-methanoindene. Hereinafter, for the purpose of brevity, this compound, which is the starting material utilized in the process herein disclosed, will be referred to as chlordene.

The product of the process presently disclosed, as named in the first paragraph of this specification, has the following structure:

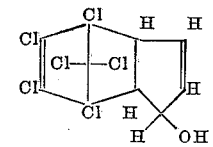

1-hydroxy-4,5,6,7,8,8-hexachloro-3a,4,7,7a-tetrahydro-4,7-methanoindene and for the purpose of brevity and convenience, said product will hereinafter be referred to as 1-hydroxy-chlordene.

In accordance with the present invention, 1-hydroxy-chlordene may be formed in a one-step reaction by oxidizing chlordene in a solvent substantially free of carboxylic acids with selenium dioxide ($SeO_2$) in the presence of at least a trace of water.

The process of the present invention has many advantages in that it is specific as to the portion of the chlordene molecule which is oxidized, and further allows for the direct, one-step preparation of an alcohol. This is unexpected because ordinarily the oxidation with selenium dioxide of a carbon atom which is allylic results in the formation of carbonyl groups rather than hydroxy groups, thus necessitating subsequent reduction to form the alcohol. Alternatively the oxidation in the presence of carboxylic acids or alcohols may result in the formation of esters or ethers respectively and again require additional treatment to form a desired alcohol. In accordance with the present process the alcohol is formed directly and no other treatment or expedient previously deemed necessary for the formation thereof by the art need be used.

Thus the present invention provides a means to introduce an hydroxyl group into chlordene at a position known and definite, to result in a desirable and valuable material. In accomplishing this purpose, extreme reaction conditions are completely avoided, thereby minimizing side reactions which might result in undesirable side products. As a result, high yields of desired product, based upon the theoretical amount possible, may be obtained.

The process of the present invention is of such a nature that the reagents utilized, such as spent selenium dioxide, and the solvents, may be recovered and re-used in the process either directly or with a minimum amount of treatment. Further, said process, because of its simplicity, is easily adapted to commercial production. All the advantages of this process as herein expressed or as evident from the nature thereof combine to very favorably affect the economics of the present invention.

To facilitate an understanding of the nature of the process, the reaction herein involved is graphically illustrated as follows:

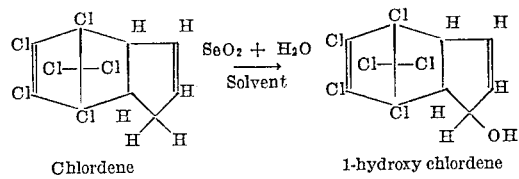

Chlordene            1-hydroxy chlordene

The oxidation reaction herein involved is based on the fact that selenium dioxide in the presence of a relatively inert solvent substantially free of carboxylic acid and in the presence of a small amount of water will react with chlordene to form 1-hydroxy-chlorene and metallic selenium. This may be accomplished, for example, by adding sufficient water to the selenium dioxide such that a solution thereof is obtained. The thus obtained solution may be added to chlordene in a solvent relatively inert to the oxidizing effect of selenium dioxide, said solvent being substantially free of carboxylic acid. The temperature of reaction should be somewhat above room temperature and will be naturally limited by the decomposition temperature of the reactants or product. Generally, temperatures between about 60 and about 185° C. are applicable, and temperatures between about 100 and 160° C. are more preferred. More specifically, the application of temperatures between about 120 and 130° C. provide a satisfactory rate of reaction to result in excellent yields of desired oxidized material in relatively short periods of time. It is thus convenient to utilize a solvent boiling within the above mentioned preferred range, such as the diethyl ether of ethylene glycol, thereby allowing the reaction to proceed at the reflux temperature of the mixture, and obviating the necessity for close temperature control.

The ratio of reactants, the method by which they may be intermixed, the operation during reaction and the time required are not critical and may be varied considerably.

The reaction mixture comprises chlordene, water, selenium dioxide and a solvent relatively inert to the oxidizing action of selenium dioxide, said solvent being substantially free of carboxylic acids. It is preferred that the water be added to the selenium dioxide and that the chlordene and solvent be then added to the selenium dioxide-water mixture either together or individually in any order; however, the order and method of combining the reactants is not critical, and it is only necessary that they are intermixed.

The amount of water utilized is not critical; however, it is preferred to maintain the concentration of water at a minimum. Thus, although as much water as is needed to dissolve the selenium dioxide can be utilized, an excess thereof, or a smaller amount thereof will be satisfactory. As a matter of fact, because of the known hygroscopic properties of selenium dioxide and the presence of small amounts of water in most materials, even those organic in nature, it may be unnecessary to add additional water to the reaction mixture. It is thus evident that only a very small amount of water, namely trace amounts, is necessary to carry out the reaction. A large excess of water, while permissible, is not desirable.

Two moles of chlordene are oxidized to the alcohol per mole of selenium dioxide reduced, and consequently this stoichiometric ratio of reactants is preferred but not critical. Thus, if less than the stoichiometric amount of selenium dioxide be utilized, then some of the chlordene will remain unchanged when the reaction is completed. Conversely, if less than the stoichiometric amount of chlordene be utilized, then excess selenium dioxide will remain in the reaction mixture after completion of said reaction. Since the selenium dioxide is water soluble and since chlordene is not, it is convenient to use a ratio of reactants which will result in the substantially complete conversion of chlordene to the alcohol, thereby obviating the necessity for separating any unreacted chlordene from the product, 1-hydroxy-chlordene. Therefore, a stoichiometric amount, or perhaps a slight excess thereof is preferred. Too large an excess of selenium dioxide should be avoided, mainly because that which does not react is subsequently removed with a water wash and is only more difficultly recoverable, all as more fully explained hereinafter.

As previously stated, the solvent utilized in the present process is one which is relatively inert to selenium dioxide, such as carbon tetrachloride, chloroform, benzene, toluene, hexane, pentane, dioxane, ethylene chlorhydrin, methanol, ethanol, butanol, pentanol, butyl ether, monomethyl ether of ethylene glycol, diethyl ether of ethylene glycol, isooctane, nitromethane, n-butyl acetate, etc. Many other suitable solvents will be suggested to one skilled in the art. A preferred amount of solvent is that which will just dissolve the reaction mixture. An excess of solvent is not harmful and may only tend to affect the rate of reaction because of the dilution effect; conversely, smaller amounts than the minimum amount necessary to dissolve the reactants completely may also be used to result in the desired product.

The solvent utilized for the present process should be substantially free of carboxylic acids for the reason that said acids tend to esterify the hydroxy chlordene formed to produce acyloxy chlordene as a contaminant in the product. Because of this reason, while small quantities of carboxylic acids may be present, the molar proportion thereof should be minor relative to the molar proportion of chlordene in the reaction mixture.

The rate of reaction is dependent upon those factors which generally affect chemical reactions. The reaction may be completed after about 20 hours or perhaps less, depending upon the specific conditions utilized. In some instances, reaction periods longer than 20 hours may be required for the reaction to proceed to substantial completion. Ordinarily, some product will have formed after only a short period of reaction. Thus, at a reaction temperature of about 120–130° C. deposition of metallic selenium usually occurs within one hour, thereby indicating the formation of some 1-hydroxy-chlordene within that period. The use of excess reaction time is not deleterious to the product, and hence, close control in this respect is not critical. The rate of reaction and extent of reaction can be fairly closely estimated by the rate of deposition of metallic selenium and by the quantity thereof deposited. If, for example, the reaction proceeds for a period of time between about 5 to about 25 hours, the metallic selenium formed during the reaction can be removed from the mixture by filtration or any other means and the weight thereof can then be determined. If such a determination indicates that the reaction, although having proceeded, is incomplete, then additional reaction time can be allowed for the remaining mixture. It is expressly understood that the present invention is not dependent upon, nor limited to, the reaction proceeding to completion, or even substantial completion. It is preferred, however, that such be the case inasmuch as it results in a more economical operation.

The reaction proceeds at ordinary pressures and pressures exceeding atmospheric need not be used. Where the vapor pressure of the reaction mixture exceeds atmospheric pressure at the temperature of reaction then pressures adequate to contain the reaction mixture will, of course, be used. Since many solvents can be used, it is often convenient to utilize one boiling at the temperature of reaction so that the reaction can be carried out under reflux conditions thereby obviating temperature control.

When the oxidation reaction of chlordene as hereinbefore described, is completed, or has otherwise been stopped, the reaction mixture contains 1-hydroxy-chlordene which is available in said mixture without further treatment or isolation for conversion to 1-chloro-chlordene which is a very valuable insecticide.

Alternatively, the 1-hydroxy-chlordene in the reaction mixture can be isolated and utilized as an intermediate in the substantially pure state. After oxidation, the reaction mixture also contains metallic selenium as a precipitate, which can easily be removed by filtering, centrifuging, decanting of supernatent liquid, or by any other ordinary means. It is preferred that the metallic selenium be removed from the reaction mixture after oxidation, whether or not it is desired to isolate the 1-hydroxy-chlordene. As a material economical aid, the selenium thus removed can be reconverted to selenium dioxide by means well known to the art and subsequently re-utilized in the process as hereinbefore described.

After metallic selenium is removed from the reaction mixture, the 1-hydroxy-chlordene can be isolated by conventional means. Thus, the solution can be washed with a dilute aqueous alkaline material such as 5% aqueous sodium bicarbonate which can then be followed by a water wash. The solution can then be dried by ordinary means such as with calcium chloride. The solvent can then be removed by evaporation, distillation, or the like means, and the residue comprising 1-hydroxy-chlordene can be further purified if desired by recrystallization from a solvent such as 1:1 mixture of benzene-hexane or by dissolving said residue in a solvent and fractionating by ordinary chromatographic means. The desired product is a crystalline solid melting at about 199–201° C.

The following examples are for the purpose of illustrating the present invention, without, however, restricting it thereto:

*Example 1*

To 50 ml. n-butyl ether was added 33.9 grams (0.1 mole) chlordene, 6.03 grams (0.053 mole) of selenium dioxide (assay=97%). There was sufficient water in the selenium dioxide used to effect the reaction and no additional water was added. The resulting reaction mixture was stirred at its reflux temperature (142° C.) for 19 hours. Precipitated selenium was filtered off, dried and weighed. Its weight (3.85 grams) indicated that the reaction was about 97.7% complete. The reaction mixture was then washed with water, dried with magnesium sulfate, and treated with activated charcoal (nuchar). The thus treated solution was stripped of solvent on a steam bath in vacuo to result in an excellent yield of crude 1-hydroxy-chlordene. The crude product was substantially purified by trituration with pentane.

It is of interest to note that while the above experiment was conducted over a reaction period of 19 hours to effect a substantially complete reaction, in an identical experiment, after only 1 hour of reaction, the oxidation was indicated to be 70% complete as evidenced by the amount of metallic selenium precipitated. Thus, under the conditions above disclosed, it is not essential that the reaction period be extended as long as 19 hours to result in substantial and economical yields of desired product. While the rate of reaction may, to some extent, depend on the type and amount of solvent used, the progress of the reaction is easily traced as above indicated.

*Example 2*

This example differs from Example 1 in the solvent utilized, the ratio of oxidizing agent to chlordene and the use of water.

A mixture of 67.8 grams chlordene (0.2 mole), 47.4 grams selenium dioxide (0.4 mole—94% assay), 25 ml. dioxane and 6 ml. of water were refluxed for 71 hours. The reaction was 79% complete after 23 hours, however the additional time was allowed for the reaction to proceed to substantial completion. Precipitated, metallic selenium was filtered off and the filtrate was concentrated on a steam bath. The residue was dissolved in ethyl acetate, washed successively with water, 5% aqueous sodium bicarbonate and again with water. The solution was then dried over anhydrous calcium chloride and evaporated to dryness on a steam bath. The residue was recrystallized from a benzene-hexane mixture to yield 58.5 grams of pure 1-hydroxy-chlordene (M. P.=199–201° C.). An additional 5.5 grams of product was isolated from the mother liquors making the total yield 64.0 grams, or 90% of the amount theoretically obtainable.

*Example 3*

This experiment was conducted in an identical manner as in Example 1, except that the solvent used was n-butyl acetate. After 24 hours the oxidation was 91% completed as determined by the quantity of selenium metal deposited. An excellent yield of substantially pure 1-hydroxy-chlordene was isolated from the reaction mixture.

In a similar manner nitromethane, a mixture of pentanols, and benzene were used as solvents in reactions according to the conditions set forth in Example 1 to result in good yields of 1-hydroxy-chlordene.

Example 4

This example exemplifies the preparation of 1-chloro-chlordene (a valuable insecticide) from crude 1-hydroxy-chlordene prepared in accordance with the present invention.

A mixture of 170 grams (0.5 mole) chlordene, 30.8 grams (0.26 mole) selenium dioxide and 250 ml. of the diethyl ether of ethylene glycol was heated at reflux with stirring for 49 hours. (The reactants contained traces of water sufficient to effect reaction and hence additional water was not required.) The precipitated, metallic selenium was filtered, washed, dried, and weighed. The selenium weighed 19.25 grams indicating the reaction was 98% completed.

The solvent was removed from the oxidized product by distillation in vacuo. The crude oxidation product comprising 1-hydroxy-chlordene was converted to 1-chloro-chlordene by treatment with 73 ml. of thionyl chloride. The first 30 ml. of thionyl chloride was added slowly to the crude oxidized product over a 15 minute period so as to maintain the temperature between 78 and 90° C. The remaining 43 ml. of thionyl chloride were added somewhat more rapidly and the mixture was then heated on the steam bath for one-half hour. Excess thionyl chloride was then removed by distillation. The residue was dissolved in hexane, washed twice with water and then dried over calcium chloride. The hexane solvent was then removed by distillation and the residue (145 grams) was distilled in vacuo. A distillate weighing 115 grams and boiling between 125 and 135° C. at 0.5 to 1.0 mm. of mercury was obtained. An analysis of this distillate showed it to contain 84.2% of 1-chloro-chlordene.

The present process is thus an unexpected but very convenient method for preparing 1-hydroxy-chlordene from chlordene by a direct, one step oxidation. The product is not only a useful intermediate in its purified state, but can also be readily converted to 1-chloro-chlordene in its crude form without the necessity of intermediate purification.

We claim as our invention:

1. The method of making 1-hydroxy-4,5,6,7,8,8-hexachloro - 3a,4,7,7a - tetrahydro - 4,7 - methanoindene which comprises oxidizing 4,5,6,7,8,8-hexachloro - 3a,4,7,7a - tetrahydro - 4,7 - methanoindene in the presence of water with selenium dioxide in a solvent substantially free of carboxylic acids.

2. The method which comprises oxidizing 4,5,6,7,8,8 - hexachloro-3a,4,7,7a-tetrahydro-4,7-methanoindene in the presence of water with selenium dioxide in a solvent substantially free of carboxylic acids and relatively inert to the oxidizing effect of said selenium dioxide at a temperature of from about 60 to about 185° C. to form a preponderance of the 1-hydroxy derivative thereof.

3. The method of claim 2 wherein the temperature is from about 100 to about 160° C.

4. The method which comprises oxidizing 4,5,6,7,8,8 - hexachloro-3a,4,7,7a-tetrahydro-4,7-methanoindene at a temperature from about 100 to about 160° C. in the presence of water with selenium dioxide substantially completely dissolved in a solvent substantially free of carboxylic acids and relatively inert to the oxidizing effect of said selenium dioxide.

5. The method which comprises oxidizing 4,5,6,7,8,8 - hexachloro-3a,4,7,7a-tetrahydro-4,7-methanoindene in the presence of water with selenium dioxide in a solvent substantially free of carboxylic acids and relatively inert to the oxidizing effect of said selenium dioxide at a temperature of from about 120 to 130° C. to form a preponderance of the 1 - hydroxy derivative thereof.

6. The method which comprises oxidizing 4,5,6,7,8,8 - hexachloro-3a,4,7,7a-tetrahydro-4,7-methanoindene at a temperature from about 120 to about 130° C. in the presence of water with selenium dioxide in a solvent substantialy free of carboxylic acids which is relatively inert to the oxidizing effect of said selenium dioxide and in an amount adequate to substantially completely dissolve the reaction mixture.

MORTON KLEIMAN.
ARTHUR GOLDMAN.

References Cited in the file of this patent

UNITED STATES PATENTS

| Number | Name | Date |
|---|---|---|
| 2,519,190 | Hyman | Aug. 15, 1950 |
| 2,528,656 | Herzfeld et al. | Nov. 7, 1950 |

OTHER REFERENCES

Urion, Compt. rend., vol. 199, pages 363–5 (1934) (3 pages).

Urion, Chem. Abst. 28, 6704 (1934).